United States Patent [19]

Kaun

[11] 4,011,374

[45] Mar. 8, 1977

[54] POROUS CARBONACEOUS ELECTRODE STRUCTURE AND METHOD FOR SECONDARY ELECTROCHEMICAL CELL

[75] Inventor: Thomas D. Kaun, Lisle, Ill.

[73] Assignee: The United States of America as represented by the United States Energy Research and Development Administration, Washington, D.C.

[22] Filed: Dec. 2, 1975

[21] Appl. No.: 636,882

[52] U.S. Cl. .............................. 429/220; 429/103; 429/221; 429/223

[51] Int. Cl.² ......................................... H01M 4/36

[58] Field of Search .............. 136/20, 22, 120, 121, 136/122

[56] References Cited

UNITED STATES PATENTS

| | | | |
|---|---|---|---|
| 3,219,731 | 11/1965 | Etzel et al. ..................... | 136/122 X |
| 3,380,856 | 4/1968 | Pohl ............................. | 136/120 FC |
| 3,395,049 | 7/1968 | Thompson .................. | 136/120 FC X |
| 3,410,731 | 11/1968 | Rightmire et al. ......... | 136/120 R X |
| 3,442,715 | 5/1969 | Yee et al. ................. | 136/120 FC X |
| 3,573,122 | 3/1971 | Olstowski ......................... | 136/122 |
| 3,629,007 | 12/1971 | Kilduff ....................... | 136/120 R X |
| 3,634,569 | 1/1972 | Emanuelson .................. | 136/122 X |
| 3,753,782 | 8/1973 | Beccu .......................... | 136/120 FC |

*Primary Examiner*—John H. Mack
*Assistant Examiner*—C. F. Lefevour
*Attorney, Agent, or Firm*—Dean E. Carlson; Arthur A. Churm; Hugh W. Glenn

[57] ABSTRACT

Positive and negative electrodes are provided as rigid, porous carbonaceous matrices with particulate active material fixedly embedded. Active material such as metal chalcogenides, solid alloys of alkali metal or alkaline earth metals along with other metals and their oxides in particulate form are blended with a thermosetting resin and a solid volatile to form a paste mixture. Various electrically conductive powders or current collector structures can be blended or embedded into the paste mixture which can be molded to the desired electrode shape. The molded paste is heated to a temperature at which the volatile transforms into vapor to impart porosity as the resin begins to cure into a rigid solid structure.

16 Claims, 2 Drawing Figures

4,011,374

POROUS CARBONACEOUS ELECTRODE STRUCTURE AND METHOD FOR SECONDARY ELECTROCHEMICAL CELL

CONTRACTUAL ORIGIN OF THE INVENTION

The invention described herein was made in the course of, or under, a contract with the United States Energy Research and Development Administration.

BACKGROUND OF THE INVENTION

This invention relates to the preparation of both positive and negative electrodes for use in high-temperature, secondary electrochemical cells and batteries that can be employed as power sources for electric automobiles and for the storage of electric energy generated during intervals of off-peak power consumption. A substantial amount of work has been done in the development of such electrochemical cells and their electrodes. The cells showing the most promise employ alkali metals, alkaline earth metals and alloys of these materials as negative electrodes opposed to positive electrodes including the chalcogens and metal chalcogenides as active materials. Typical examples include lithium, sodium or calcium and alloys of these active materials with more stable elements such as aluminum or boron as the negative electrode materials. In the positive electrode, active materials advantageously include metal sulfides and mixtures of metal sulfides such as the iron sulfides, cobalt sulfides, copper sulfides, nickel sulfides, cesium sulfides and molybdenum sulfides.

Examples of such secondary cells and their components are disclosed in U.S. Pat. No. 3,907,589 to Gay et al., entitled "Cathodes for a Secondary Electrochemical Cell" and in U.S. Pat. No. 3,947,291 Mar. 30, 1976 to Yao et al., entitled "Electrochemical Cell Assembled in Discharged State"; U.S. Pat. No. 3,933,521 Jan. 20, 1976 to Vissers et al., entitled "Improved Anode for a Secondary High-Temperature Electrochemical Cell", U.S. Pat. No. 3,941,612, Mar. 2, 1976 to Steunenberg et al., entitled "Improved Cathode Composition for Electrochemical Cell"; and U.S. Pat. No. 3,933,520, Jan. 20, 1976 to Gay et al., entitled "Method of Preparing Electrodes with Porous Current Collector Structures and Solid Reactants for Secondary Electrochemical Cells". Each of these patents is assigned to the assignee of the present application.

Prior electrodes have been prepared by various techniques and many have performed reasonably well. A number of problems still exist respecting long-life electrodes having sufficiently high specific energy and specific power for such as vehicular applications. Active materials in solid rather than liquid form have been selected to enhance retention and cell life. However, the uniform distribution of active material within current collector structures without drifting during operation continues to be of concern.

In some electrodes, paste mixtures of electrolyte and particulate active material have been pressed into electrically conductive metal screens, mesh or other lattice structures. These type electrodes are tedious to prepare, as they require elevated temperatures over extended periods of time during the pressing operation. Also, it has been difficult to form a uniform electrode with hot pressing techniques. In other electrodes, particulate active material has been vibrated into a porous electrically conductive current collector structure. In this method, the particle sizes and substrate interstices must be appropriately matched to obtain adequate loading with good distribution and to prevent slumping of the material within the substrate. Slumping can be a particularly difficult problem when electrodes are arranged vertically rather than horizontally. Proper distribution of active material is of considerable importance where the active material undergoes substantial volumetric changes between the condition in which it is loaded and the conditions it attains during cycling. This, for example, occurs when iron sulfides react to form lithium sulfide.

Therefore, in view of these problems that have occurred with previous electrodes, it is an object of the present invention to provide an improved porous electrode structure with solid active material fixedly embedded therein.

It is a further object to provide an electrode paste material that can be molded to form electrodes and solidified into a porous substrate mass that retains its shape during operation.

It is a further object to provide an improved method for preparing a porous electrode structure with embedded, solid active material.

SUMMARY OF THE INVENTION

In accordance with the present invention, an improved electrode is provided for use in a secondary electrochemical cell. The electrode includes a porous matrix of thermosetting, carbonaceous material with solid particles of the electrode active material fixedly embedded within the matrix. The matrix can also contain embedded electrically conductive materials for electrode current collection.

The invention also comprehends a paste composition that can be molded into desired electrode shapes. The paste composition includes a thermosetting, carbonaceous material, particulate active material and a solid volatile, all blended into a generally uniform paste mixture. After forming the desired electrode shape and structure with the paste composition, the paste is heated to a sufficient temperature to transform the volatile to vapor phase, by sublimation or decomposition, while curing the thermosetting carbonaceous material to form a rigid but porous matrix.

The improved electrode structure is suitable for both positive and negative electrodes within secondary cells. It is particularly well suited for electrodes that include solid, particulate active material and are to be operated in an orientation, e.g. vertical, tending to produce slumping or drifting during cycling. Examples of contemplated active materials in the positive electrodes include the chalcogenides, i.e. the oxides, sulfides and selenides of metals such as iron, cobalt, nickel, copper, lead, zinc, antimony, and manganese. In the negative electrode, examples of active materials include solid alloys of lithium, calcium or possibly sodium with such relatively inert elements as aluminum, boron, beryllium or magnesium. Also metals that remain solid at the cell operating temperature, e.g. lead in a lead-sulfuric acid battery can be employed. It is also to be understood that an electrode provided in accordance with the present invention can be used within an electrochemical cell opposite to a conventional electrode.

Suitable thermosetting materials are those that can be provided as liquid or moldable substance while in a monomer or partially polymerized form. On heating, these thermosetting materials become more completely polymerized, that is cured, to provide a rigid carbonaceous matrix. Many of the phenolic, epoxy and furfuryl resins can be used as the thermosetting material.

The solid volatiles blended into the paste mixture include both inorganic and organic materials that will transform, that is decompose or sublimate, directly from solid to vapor to impart porosity to the resin as it cures. Various carbonates, bicarbonates and organic compounds have been found to be suitable for this application. In a somewhat altered procedure, volatiles with higher transformation temperatures can be selected if carburization or graphitization of the matrix is to be performed.

BRIEF DESCRIPTION OF THE DRAWINGS

The present invention is illustrated in the accompanying drawings wherein.

DETAILED DESCRIPTION OF THE PREFERRED EMBODIMENT

Figure 1:
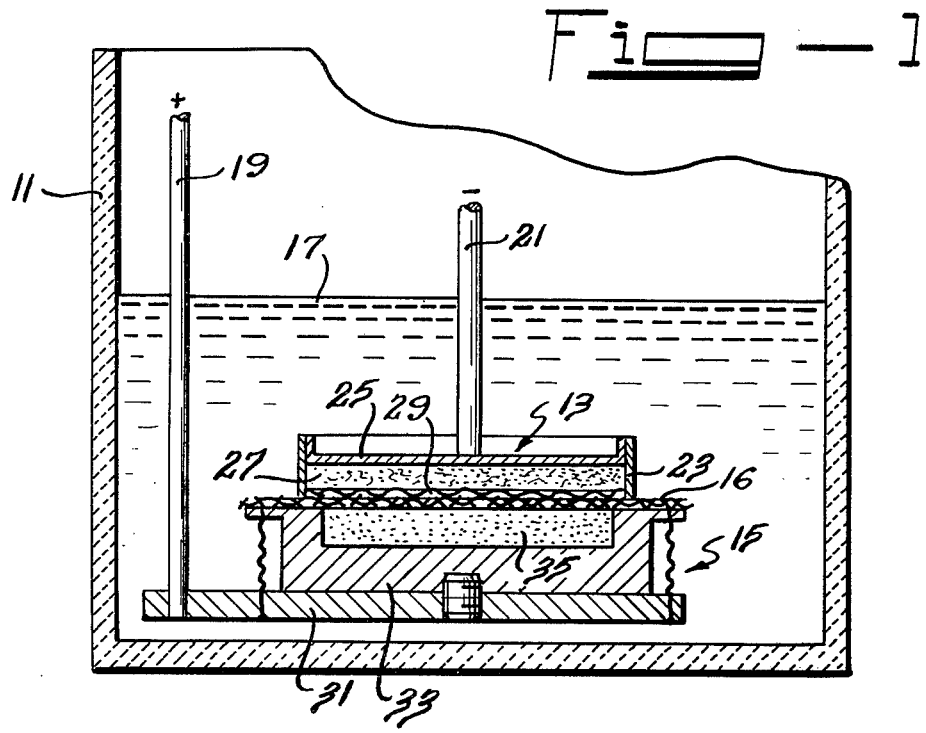
FIG. 1 is a generally schematic view in vertical cross section of a typical electrochemical cell used in testing improved electrodes.
Figure 2:
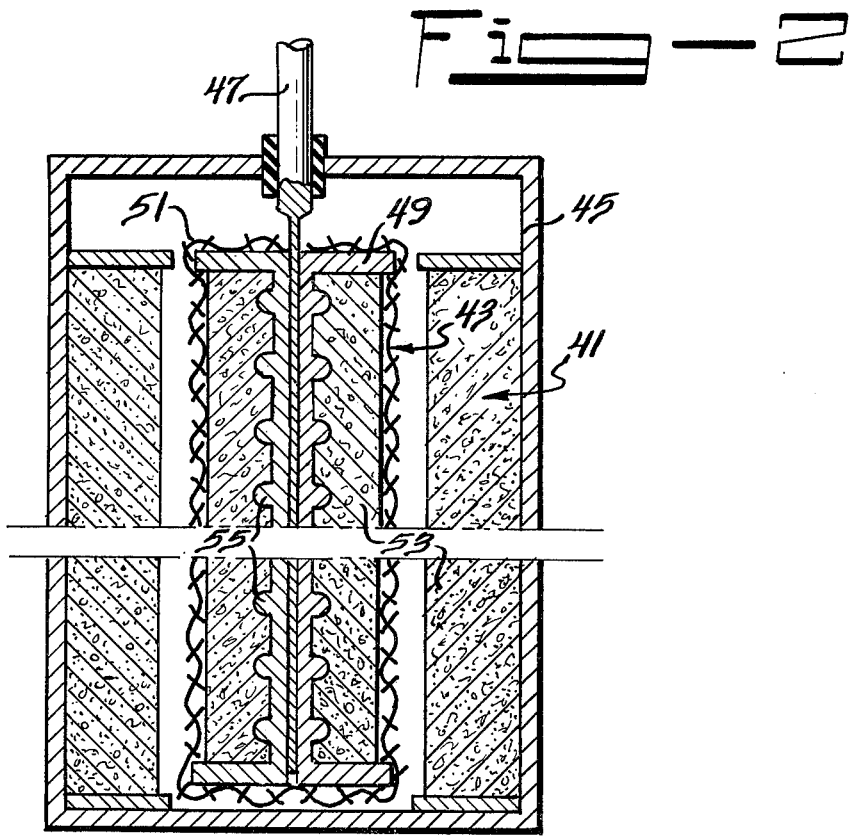
FIG. 2 is a schematic view of another cell configuration.

In FIG. 1, an electrochemical cell is shown contained within a ceramic crucible 11. The cell includes a negative electrode 13 and a positive electrode 15 submerged within a liquid electrolyte 17. Electrical conductors 19 and 21 extend from the positive and negative electrodes, respectively, for connection to electrical instrumentation for evaluating the cell. An electrode separator fabric 16 of electronically insulative material separates the positive and negative electrodes while permitting ionic current flow during operation of the cell. The cell as illustrated merely typifies the type cell employed in demonstrating the improved electrodes of the present invention. It will be clear that various other cell types, for instance as illustrated in FIG. 2 and the patent applications cited in the Background of the Invention, can incorporate the improved electrodes described herein.

The negative electrode 13 is shown held within a metal support ring 23 with cover 25 in electrical communication with conductor 21. A retainer screen 29 covers the lower surface of the electrode. The electrode active material is contained within a porous matrix 27, as will be described below.

The positive electrode 15 is shown made up of an electrically conductive and chemically inert base structure 31 that supports and makes electrical contact between conductor 19 and the electrode cup 33. Cup 33 as illustrated can be a porous electrically conductive material such as of graphite or steel to hold and support the porous matrix 35 containing the electrode active material.

The electrolyte 17 that surrounds and permeates into the two electrodes can be any of a number of suitable electrolytic liquids. For example, molten salts such as the eutectic compositions of LiCl—KCl, LiCl—LiF—KCl and LiF—LiCl—LiI can be used in high-temperature cells. Various other suitable electrolytic salts can be selected from those listed in U.S. Pat. No. 3,716,409 to Cairns et al., entitled "Cathodes for Secondary Electrochemical Power-Producing Cells". In other cells operated at lower temperatures, such as a lead-sulfuric acid cell, aqueous and possibly organic liquids can serve as electrolyte solvents.

The improved electrodes of the present invention include a porous, carbonaceous substrate or matrix. These matrices are illustrated as 35 in the positive electrode and 27 in the negative electrode. The electrode active material is embedded and uniformly distributed within each matrix. Each matrix can also include an electrically conductive material in powdered, fibrous, particulate, mesh, screen, network or lattice form to enhance current collection. Electrically conductive materials such as carbon, metal compounds, or metals, e.g. iron, cobalt, nickel, molybdenum and niobium, are suitable current collector materials for this purpose. They can be added as particulate filler materials or as embedded mesh or other networks in the molding steps of electrode preparation.

In FIG. 2, an alternate cell configuration is shown with two negative electrodes 41 on either side of a central positive electrode 43. Each negative electrode is electrically contacted by the cell housing 45 while a central conductor 47 is affixed between two electrically conductive trays 49 of the positive electrode. An electrically insulative fabric 51 separates the electrodes but is permeated by electrolyte liquid (not shown) to provide ionic conduction. Each electrode as illustrated includes a porous, carbonaceous matrix 53 containing the appropriate active material. Small corrugations or ridges 55 are illustrated on surfaces of the positive electrode trays 49 to assist in maintaining the paste and subsequently the matrix in position. Various other means such as perforations can also be used for this purpose. Suitable retainer cloths of such as of zirconium can be positioned over the exposed surfaces of each electrode.

In preparing the electrodes, a paste composition is initially formed. The paste includes a thermosetting carbonaceous material in liquid or at least moldable form, particles of the electrode active material and particles of a volatile substance. Powdered electrically conductive material can also be included in the paste as mentioned above. The paste is formed into the desired electrode shape and heated to a sufficient temperature to cure the thermosetting carbonaceous material and to sublimate or decompose the volatile substance. As the volatile transforms to vapors, porosity is imparted to the carbonaceous material as it solidifes into a rigid structure of the desired shape. Various shapes including disks, plates, tubes and cylinders with various cross sections are contemplated. Electrically conductive mesh, screen or perforated sheets can serve as molds and current collectors.

In one manner of preparing electrodes, the carbonaceous material and volatile substance preferably are selected to activate at approximately the same temperatures. The volatile should preferably sublimate or thermally decompose at a temperature slightly or somewhat below that at which the thermosetting material completely solidifies into a rigid porous structure. It can be advantageous to select thermosetting materials, e.g. thermosetting resins, that polymerize and solidify slowly over extended periods of time, e.g. 2 to 24 hours, at temperatures at or near the transformation temperatures of the volatile. Such a combination of these materials permits the smooth development of porosity within the electrode structure without fracture of already solidifed resin or splattering of paste as the volatile vaporizes.

In selecting the carbonaceous, thermosetting binding material, a large number of known thermosetting resins appear suitable for use. Polymerization resulting in solidification normally can be effected by curing at temperatures of about 40° to 200° C. For some resins, e.g. furfuryl alcohol, a catalyst is added. A comprehensive listing of such carbonaceous binders is given in *Proceedings of the Fourth Conference on Carbon*, "Synthetic Binders for Carbon and Graphite", by Riesz and Susman, pages 609–623, Pergamon Press, 1960. Selected resins suitable for use in the present application are given in Table I.

TABLE I

| Name and source | Type | Coke residue % |
| --- | --- | --- |
| ARL No. J1254 U.S. Steel Corp. | Coal tar pitch | 52.5 |
| Durez 7031A (ON 3266) Hooker Electrochemical Co. | Phenol-formaldehyde | 52.1 |
| Durez 16470 RI-3385 Hooker Electrochemical Co. Durez Catalyst 17932 | Liquid furfuryl alcohol polymer | 49.1 |
| Polyacrylonitrile American Cyanamid Co. | Polyacrylonitrile | 44.3 |
| Phenol-benzaldehyde Armour Research Foundation | Phenol-benzaldehyde | 37.3 |
| White rosin powder Fisher Scientific Co. | Natural rosin with diluent | 28.1 |
| Polybutadiene rubber Phillips Petroleum Co. | Polybutadiene rubber | 12.1 |
| LL-1 Hercules Powder Co. | Cellulose acetate | 11.7 |
| Kralastic B U. S. Rubber (Naugatuck) | Butadiene-acrylonitrile and styrene-acrylonitrile blend | 11.6 |
| Cymol 405 American Cyanamid Co. | Melamine-formaldehyde | 10.2 |
| Epon S2S, Diethylenetriamine Cured Shell Chemical Co. | Epoxy resin | 10.1 |
| Agerite D Vanderbilt | Polymerized trimethyl dihydroxyquinoline | 8.0 |
| Cyacor 151 American Cyanamid | Urea formaldehyde | 8.2 |

In Table I, coke residues were determined after carburizing the resin at a temperature of 950° C. for 7 minutes. Those resins having high coke residues are advantageously used in the present application particularly where carburization or graphitization of the matrix is planned to enhance current collection. Other resins having less than about 10% coke residue may require additional electrically conductive material for current collection. Those resins found preferable for use include phenol-formaldehyde, phenolbenzaldehyde, furfuryl alcohol polymer and epoxy resins. Various coal tar pitch binders are also well suited for electrode preparation, but these materials are complex mixtures of indefinite chemical structure and may require close control to provide reproducible electrode structures.

The volatile substance employed in the electrode paste is one that will transform directly from the solid to the vapor state. This can occur by such processes a sublimation as in the case of carbon dioxide (dry ice) or decomposition as in the case of ammonium carbonate which decomposes at about 58° C. to form carbon dioxide and ammonia gas. Various volatiles with their transformation temperatures from solid to vapor are given in Table II.

TABLE II

| Volatile | Transformation Temperature, ° C. |
| --- | --- |
| Ammonium carbonate | 58 |
| Ammonium bicarbonate | 100 |
| Copper acetylacetone | 230 |
| Hexachloroethane | 170 |
| Potassium amide | 400 |
| Ferrous chloride | 670 |

The volatile substance is selected for use with the carbonaceous binder material in mind. The gases produced on decomposition or sublimation of the volatile must be released through the paste or plastic mixture to impart porosity and are preferably released before too rigid a structure is produced that might trap high-pressure gases or result in fracture of the solid electrode structure. Therefore, the volatiles are preferably selected with a transformation to vapor temperature that is less than the temperature which will rapidly result in rigid setting of the carbonaceous binder material. Of those listed in Table II, ammonium carbonate and ammonium bicarbonate are of preference in this regard.

In most of the resins listed in Table I, particularly furfuryl alcohol, phenol-benzaldehyde and phenol-formaldehyde, a sufficiently plastic or semisolid resin is formed during curing such that volatiles which transform at even higher temperatures than normal curing temperatures can be used to provide a porous substrate. Such thermosetting materials might be selected for use where it is desirable to not only polymerize and cure the resin into a solid structure but also to carburize or to graphitize the resulting porous matrix.

Various electrically conductive fillers can be incorporated into the paste mixture. Electrically conductive metal powders of iron, cobalt, nickel, tungsten, molybdenum, niobium and powders or various other electrically conductive metals or carbon can be blended into the paste. Alternatively, or in addition to these powders, electrically conductive structures such as mesh, perforate sheets, screens, networks, lattices or single conductor configurations of electrically conductive material can be embedded into the paste prior to the thermosetting procedure. Such structures can be employed to hold the paste in the desired shape.

Electrically conductive lattices of various metal carbides can be chemically produced within the porous electrode structure. As an example, $Nb_2C$ powder can be blended along with carbon powder into the paste mixture and incorporated into the porous solid matrix. During cell cycling at 400° to 550° C., the $Nb_2C$ and carbon react to form NbC in a continuous lattice throughout the rigid electrode structure. Other electrically conductive lattices are contemplated that can also be chemically provided in accordance with the following reactions:

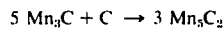

In the improved electrodes of the present invention, the active materials are incorporated into the paste mixture in solid, particulate form. Various active materials can be used. For example, in the positive electrode, metal chalcogenides, that is sulfides, oxides and selenides of various metals are contemplated. The transition metal sulfides including sulfides of iron, cobalt and nickel as well as the copper sulfides and mixtures of one or more of these compounds have been found to be particularly well suited for high-energy electrochemical cells. These materials are relatively plentiful and remain solid at typical cell operating temperatures of 400° to 550° C. at which typical electrolytic salts contemplated are molten. In addition, electrodes including solid, particulate active materials intended for use at lower temperatures, for example with lead or lead dioxide as in the lead-sulfuric acid battery can be provided within the scope of the invention.

In the negative electrode, the active material can comprise an alloy of the reactant, e.g. an alkali metal or an alkali earth metal and a more chemically inert element such as those in Groups IIIA and IVA of the Periodic Table. The alloys are provided in solid particulate form and are selected from those which remain solid at the cell operating temperature. For example, alloys of lithium-aluminum and lithium-boron as well as calcium-aluminum, calcium-silicon, calcium-boron, calcium-magnesium, calcium carbide and ternary and quaternary alloys including these reactants and inert materials can be employed.

After the paste mixture has been heated to produce its solidification, the particulate active materials become fixedly embedded within the porous substrate structure. On cycling within the cell, the negative electrode reactant, e.g. lithium, ionizes into the electrolyte and reacts with the metal chalcogenide within the positive electrode. However, the inert components of the active material, for instance iron in the positive electrode and aluminum within the negative electrode, remain embedded within the porous substrate structure and can be returned to their original state, e.g. iron sulfide and lithium-aluminum alloy, on recharge of the cell. This occurrence is an important feature of the present electrode in maintaining uniform distribution of active materials within the matrices during cycling.

The following examples are presented in order to further illustrate the present invention.

EXAMPLE I (Cell TK-3)

About 20 to 25 grams of a paste composition including 5% by volume phenol-formaldehyde resin, 45% $FeS_2$ particles, about 60–230 micrometers particle size, and 50% particulate ammonium carbonate, about 40 micrometers particle size, was prepared by blending the constituents together into a uniform mixture. A thin layer of a few millimeters thickness of this paste was spread over an expanded molybdenum mesh screen within a graphite cup. A layer of carbon cloth was then embedded into the exposed face of the paste mixture. The paste was cured in air by slowly heating to a temperature of about 60° C. over a period of about 2 hours and then heating to 120° C. which was maintained for about 16 hours. This procedure produced a rigid porous substrate structure including about 50% porosity with much of the active material, $FeS_2$, exposed to the interstitial volume. The substrate was assembled in an experimental cell similar to that illustrated in FIG. 1 opposite a Li—Al electrode of excess capacity and operated at about 450° C. with LiCl—KCl eutectic salt as electrolyte. The cell operated for over 350 hours and 30 cycles using about 86% of theoretical capacity at 40 $mA/cm^2$ current density and 78% at 60 and 80 $mA/cm^2$ current densities. The positive electrode exhibited no apparent deterioration during the test.

EXAMPLE II

As a proposed alternative to the positive electrode described in Example I, copper acetylacetone is substituted for ammonium carbonate as the volatile material in preparing the paste mixture. After partially curing the paste, the electrode is disposed in an inert gas atmosphere and heated to about 1000° C. for about 7 minutes in order to carburize the thermosetting resin. Further temperature increase to about 2800° C. for about 8 hours graphitizes the structure to form an electrically conductive carbon matrix. During the early portions of the heating procedure, the volatile is driven off to ultimately form a porous, graphite matrix with embedded $FeS_2$ particles exposed to interconnecting interstitial volumes.

EXAMPLE III

The paste composition of Example I is altered by substituting an epoxy resin of epichlorohydrin, bisphenol A and diethylenetriamine for the phenol-formaldehyde and by substituting ammonium bicarbonate for the volatile. In addition to the other base constituents, approximately 1.5 grams of graphite powder, of less than 40 micrometers particle size, is included into the paste mixture to impart added current collection.

EXAMPLE IV (Cell KK-1)

About 250 grams of a paste including by volume about 5% phenol-formaldehyde, about 45% FeS particles and about 50% ammonium carbonate was prepared. The paste was spread in two 5-mm thick layers on two perforated iron sheets and cured at about 50° C. for 18 hours in air and at about 110° C. under vacuum for 6 hours to insure removal of all volatiles. These two portions of the positive electrode were assembled with a sheet of carbon cloth between the two halves contacting the steel sheets and with zirconia cloth and stainless steel cloth assembled around the periphery as retainers. This positive electrode was assembled along with conventional negative electrodes within a cell having the characteristics shown in Table III and generally illustrated in FIG. 2. The cell was operated at 450°–525° C. for over 1300 hours and 62 cycles at more than 75% energy efficiency and 60% active material utilization. Current densities between 25–150 mA/cm² were obtained. Inspection of the positive electrode after operation indicated that the FeS had remained fairly uniformly distributed within the porous, carbonaceous matrix.

TABLE III

| EXAMPLE IV | |
|---|---|
| General | |
| Two negative and one intermediate positive electrode in vertical layers | |
| Matched electrode capacity | 105 amp hr |
| Theoretical energy density | 120 watt hr/Kg |
| Positive Electrode | |
| Dimensions | 7.6 × 12.7 cm |
| Half thickness | 0.5 cm |
| Electrode surface area | 190 cm² |
| FeS loading density (50% void vol.) | 1.15 amp hr/cc |
| Current collector | 0.04 mm thick steel |
| Negative Electrodes - LiAl in iron foam | |
| (each electrode) | |
| Electrode thickness | 0.8 cm |
| Electrode area | 95 cm² |
| Separator | BN cloth w/yttria on negative side |
| Electrolyte | LiCl-KCl eutectic |

EXAMPLE V (Cell KK-2)

The procedure for preparing the positive electrode in Example IV was followed except that the PASTE comprised by volume 30% FeS$_2$, 5% phenol-formaldehyde and 65% ammonium carbonate. The resulting porous, carbonaceous matrix included about 65% void volume.

EXAMPLE VI (Cell TK-4)

A paste composition of 22 grams having BY volume about 40% aluminum powder, about 5% furfuryl alcohol with suitable acid catalyst and about 55% ammonium carbonate in uniform mixture was prepared. The paste was packed into a steel ring housing faced with 100 U.S. mesh stainless steel screen and zirconia cloth. The electrode was cured at about 65° C. in air for 24 hours. The resulting porous carbonaceous matrix was assembled in an electrochemical cell opposite a conventional lithium-aluminum electrode and lithium was electrochemically deposited onto the aluminum embedded within the matrix. During formation of the lithium-aluminum within the carbonaceous porous matrix, some lithium probably reacted with carbon, forming stable Li$_2$C$_2$. It is expected that the Li$_2$C$_2$ contributes to the current collecting structure in the completed negative electrode. This electrode was cycled for over 500 hours and 40 cycles at ±0.35 volts to demonstrate its feasibility. A negative electrode as thus formed can be assembled opposite to one of the positive electrodes previously described to form a power-producing electrochemical cell.

EXAMPLE VII

The paste mixture of Example VI is altered by substituting 50 atom % lithium-aluminum particles for the aluminum particles. An electrode formed in this manner after suitable curing and porosity development is ready for immediate use in an electrochemical cell vs. a positive electrode.

EXAMPLE VIII

Two electrodes are prepared from a paste having 115 g Pb particles of less than about 800 micrometers, 12 g ammonium carbonate of less than about 800 micrometers size, 13 g carbon powder, 11 g furfuryl alcohol. The paste is spread over two graphite plates and cured under vacuum at 120° C. for 16 hours. The electrodes as thus prepared are assembled as an electrochemical cell with sulfuric acid electrolyte. On charging with an outside source of electrical potential, one electrode is established as a positive electrode while the other serves as the negative electrode.

It can be seen from the above examples and description that the present invention provides an improved electrode structure for use in positive or negative electrodes that includes particulate solid active materials. The active material is embedded within a porous, carbonaceous matrix such that it maintains its position during cycling. Sufficient porosity is developed in the structure to provide intimate contact between the active material and the cell electrolyte. Since the electrode at one point in its construction is in paste form, it can be molded into any desirable shape. Improved electrode current collection can be obtained by including electrically conductive fillers in the paste structure and porosity can be controlled by varying the amount of volatile incorporated within the paste mixture.

The embodiments of the invention in which an exclusive property or privilege is claimed are defined as follows:

1. An improved electrode for use in a high-temperature, secondary electrochemical cell including a molten salt electrolyte, said electrode comprises a solid, porous matrix of thermosetting, carbonaceous material of about 50–65% porosity having solid particles of metal sulfide selected from the group consisting of sulfides of iron, cobalt, nickel and copper, fixedly embedded therein in a generally uniform distribution and exposed to interstitial volume within said porous matrix.

2. The electrode of claim 1 wherein said matrix includes a continuous, electrically conductive lattice comprising a metal carbide.

3. The electrode of claim 2 wherein said metal carbide is selected from the group consisting of Mn$_5$C$_2$, NbC and Cr$_3$C$_2$.

4. A paste composition for forming an electrode for use in a high-temperature, secondary electrochemical cell, said paste composition comprising a thermosetting material in liquid form, particulate active material and solid volatile in a generally uniform mixture, said particulate active material being selected from the group consisting of sulfides of iron, cobalt, nickel and copper and said solid volatile being about 50–65% of the total volume of paste constituents.

5. The paste composition of claim 4 wherein said thermosetting material is a resin selected from the group consisting of phenol formaldehyde, phenol benzaldehyde and furfuryl alcohol.

6. The paste composition of claim 4 wherein said solid volatile transforms to vapor at a temperature below that at which said thermosetting material cures to a rigid solid.

7. The paste composition of claim 4 wherein said paste includes particles of an electrically conductive filler selected from the group consisting of metal powders and carbon powder.

8. The paste composition of claim 4 wherein said volatile is a solid particulate material that is capable of transforming directly from solid to vapor at atmospheric pressure.

9. The paste composition of claim 4 wherein said volatile is selected from the group consisting of ammonium carbonate, ammonium bicarbonate, copper acetylacetone, hexachloroethane, potassium amide and ferrous chloride.

10. The paste composition of claim 4 wherein said volatile is ammonium carbonate or ammonium bicarbonate.

11. A method of preparing an electrode including a particulate active material selected from the group consisting of sulfides of iron, cobalt, nickel and copper for use in a high-temperature, secondary electrochemical cell, said method comprising blending thermosetting carbonaceous material in liquid form with the particulate active material and solid volatile to form a generally uniform paste, said solid volatile being provided in sufficient amount to be about 50–65% of the total volume of paste constituents; and heating said paste to transform said volatile to vapor and to cure said thermosetting, carbonaceous material into a rigid, porous matrix containing said active material.

12. The method of claim 11 wherein said paste is molded into the shape of said electrode prior to said heating step.

13. The method of claim 11 wherein said paste is heated to a temperature of about 40° C. to 200° C. to cure said thermosetting material and transform said volatile whereby emission of vapors just before and during thermosetting produces porosity in said matrix.

14. The method of claim 11 wherein said porous matrix is heated to a temperature in excess of 900° C. to carburize and then to a temperature in excess of 2800° C. to graphitize said matrix.

15. The method of claim 11 wherein a particulate metal carbide and carbon are blended into said uniform paste and said matrix is heated to 400°–550° C. to react said metal carbide and carbon to form a continuous electrically conductive lattice within said rigid, porous matrix.

16. The method of claim 15 wherein said metal carbide is $Nb_2C$, $Mn_3C$ or $Cr_{23}C_6$ and reacts with carbon to form a continuous lattice of $NbC$, $Mn_5C_2$ or $Cr_3C_2$ respectively.

* * * * *